United States Patent [19]

Lewis

[11] Patent Number: 4,616,970
[45] Date of Patent: Oct. 14, 1986

[54] TOW BAR BLOCK AND TOW BAR ASSEMBLY

[75] Inventor: James L. Lewis, Lake Orion, Mich.

[73] Assignee: Arthur J. Bott, Grand Rapids, Mich.; a part interest

[21] Appl. No.: 660,067

[22] Filed: Oct. 12, 1984

[51] Int. Cl.$^4$ ............................................. B60P 3/06
[52] U.S. Cl. ................................. 414/563; 254/134; 267/153; 414/786
[58] Field of Search ............... 414/563, 786; 254/2 B, 254/133 R, 134; 267/116, 140, 153

[56] References Cited

U.S. PATENT DOCUMENTS

| | | | |
|---|---|---|---|
| 2,564,111 | 8/1951 | Kimball | 414/563 |
| 2,649,933 | 8/1953 | Hecker | 254/133 R |
| 2,933,211 | 4/1960 | Smith | 414/563 |
| 3,044,747 | 7/1962 | Nolden | 254/134 |
| 3,091,431 | 5/1963 | Arnes et al. | 254/2 B |
| 3,858,734 | 1/1975 | Holmes | 294/81.5 |
| 4,010,858 | 3/1977 | Mahnke, Jr. | 414/563 |
| 4,527,812 | 7/1985 | McFadden | 414/563 |

OTHER PUBLICATIONS

GM Serviceability Assessment Exhibit, 1986, p. 83.
General Motors Passenger Car and Light Truck Towing Instructions, 1986, pp. 2 and 13.
Tow Times, vol. 3, No. 2, Sep. 1985, pp. 38 and 45.
Spacer Block Revolutionize Towing, Grand Rapids Plastics, Inc., Aug. 1985.
"Supplement to General Motors 1984 T-55 Towing Instructions", 11 pages.

Primary Examiner—Robert J. Spar
Assistant Examiner—Ken Muncy
Attorney, Agent, or Firm—Price, Heneveld, Huizenga & Cooper

[57] ABSTRACT

A spacer block for a tow bar which has a central support having an opening therethrough to receive the tow bar and a plurality of faces disposed around the central support. Each face has a different configuration adapted to conform to the shape of support elements provided on the underside of a vehicle. The faces are connected to the central support by a plurality of webs which absorb impact, forces which would otherwise be transmitted to the automobile by the towing apparatus while the vehicle is being towed.

62 Claims, 7 Drawing Figures

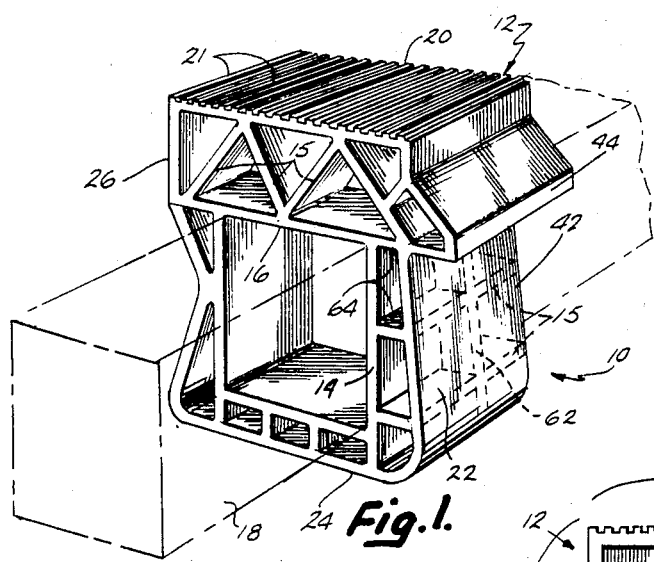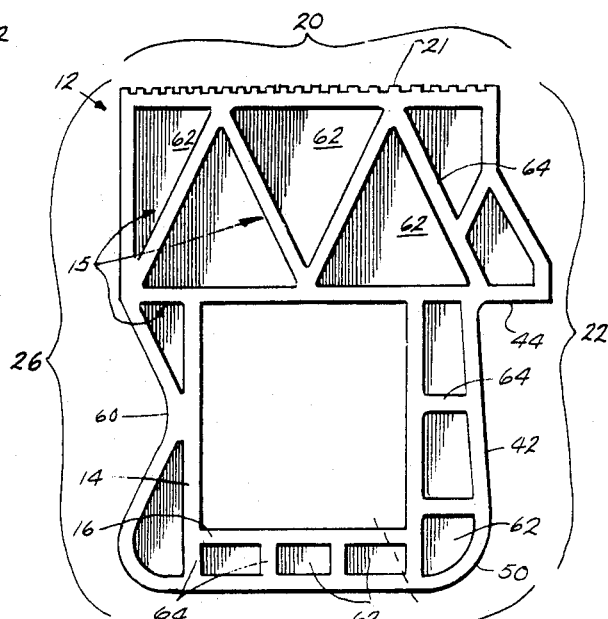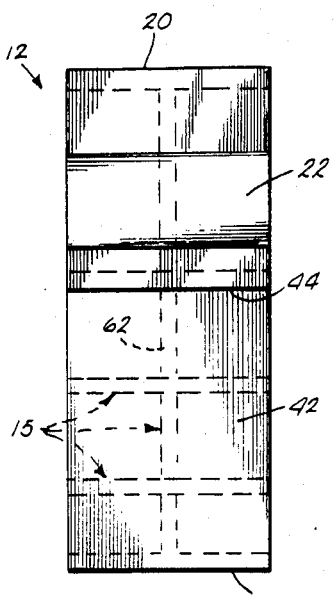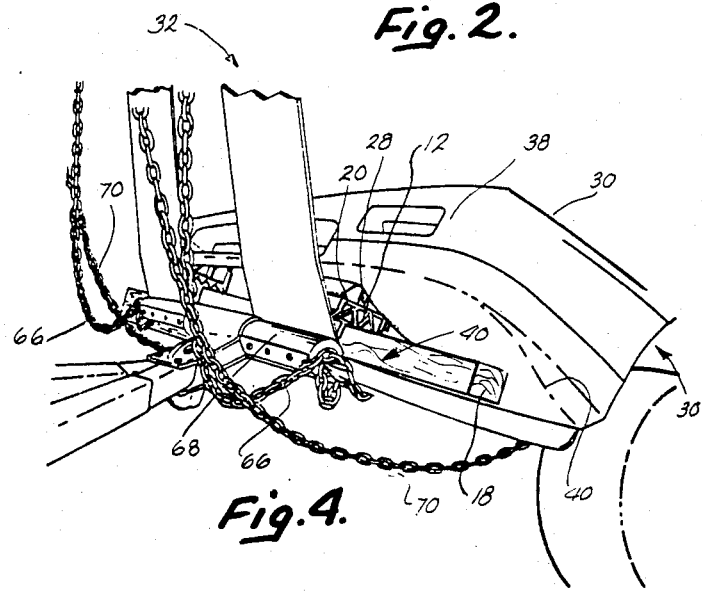

TOW-BAR BLOCK AND TOW BAR ASSEMBLY

BACKGROUND OF THE INVENTION

This invention relates to devices for towing automobiles and other motor vehicles and, in particular, to tow bar blocks which are positioned on a tow bar to support the vehicle while it is being towed.

In recent years, automobile manufacturers have recommended various measures be taken when towing vehicles to prevent the tow equipment from damaging the automobile body or finish. These measures are particularly important in cars made from lightweight material or cars having aerodynamic spoilers or air dams which can easily be damaged by such equipment during towing.

One measure recommended is to use a tow bar which consists of an elongated four-by-four wooden timber with two inverted U-shaped wooden tow blocks slidably mounted on the timber. The blocks are constructed so that they present a flat surface on the top of the inverted U. The tow bar arrangement described above is used with a standard sling-type crossbar towing device. The tow bar is positioned between the sling and the automobile undercarriage with the flat surfaces of the spacer blocks oriented upwardly to support the automobile. The spacer blocks are positioned to engage support elements on the underside of the car provided by the manufacturer to bear the weight of the car during towing. If the tow bar assembly were not used, the lightweight aerodynamic spoilers, bumpers or air dams of some cars would have to bear much of the vehicle's weight during towing which, of course, these parts were not designed to do.

Different cars have differently configured towing support elements. A flat surfaced tow block is not always satisfactory. The tow blocks can slip from or damage the support elements. The wooden tow blocks can also split if they are subjected even to moderate impact forces over time. If the blocks split or shift, the vehicle can shift while being towed such that the parts of the vehicle not designed to bear the weight of the vehicle are forced to do so, causing damage to the vehicle. Lastly, the wooden blocks are quite rigid and do not provide significant cushioning between the vehicle and the tow bar. The resulting shocks transmitted to the vehicle through the wooden tow bar blocks may damage the car, too.

SUMMARY OF THE INVENTION

The present invention is a tow bar block which includes a central opening therethrough adapted to receive a wooden tow bar. A plurality of faces are spaced from the central opening facing outwardly with respect thereto. At least two faces have a differing configuration adapted to conform to the differing configurations of vehicle support elements.

Alternatively, or possibly in addition thereto, the different faces are spaced at different intervals from the central opening to accommodate different vehicles. Preferably, the central opening is defined by a central support member joined to the faces by a plurality of webs which flex to absorb the impact of the tow bar blocks against the vehicle support elements.

Because each face is configured to accommodate a different vehicle, the same tow block can be used to tow a variety of different vehicles, minimizing the risk of slippage. Furthermore, the differing shapes enhance the chances that each face has a shape which is better adapted to receive its corresponding support element on the vehicle being towed. This reduces the risk that the vehicle will slip from the block. Finally, since the webs flex to absorb impact, the vehicle being towed is protected against vibration damage. Therefore, the tow bar block of the present invention overcomes many of the deficiencies of the U-shaped wooden tow bar blocks.

BRIEF DESCRIPTION OF THE DRAWINGS

FIG. 1 is a perspective view of a tow bar block of the present invention mounted on a tow bar (in phantom);

FIG. 2 is a side elevation of the tow bar block of the present invention with the opposite side being substantially a mirror image thereof;

FIG. 3 is a front view of the tow bar block of the present invention;

FIG. 4 is a perspective view from below illustrating the tow bar block assembly being used to tow a vehicle with a conventional sling-type towing apparatus;

DETAILED DESCRIPTION OF THE PREFERRED EMBODIMENT

Figure 5:
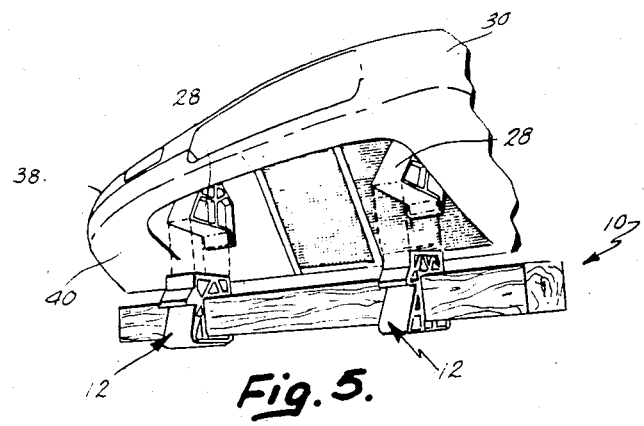
FIG. 5 is a perspective exploded view showing the positioning of the tow bar assembly of the present invention under the end of the vehicle illustrated in FIG. 4.

Illustrated in FIGS. 1, 4 and 5 is a tow bar assembly 10 employing the spacer blocks 12 of the present invention. Each spacer block 12 includes a central support 14 having an opening 16 therethrough which slidably receives the tow bar 18. Each block 12 also includes four faces 20, 22, 24 and 26 disposed around and operably connected to central support 14 by a plurality of webs 15 which flex to absorb impact forces. Each face has a different configuration adapted to conform to the different shapes of different vehicle support elements.

Preferably, the tow bar blocks of the present invention are molded from a tough polymeric material to provide the resilience desired in the webs to absorb impact. Specifically, an ionomeric material such as that sold by E. I. du Pont under the trademark SURLYN is desirable. Such ionomeric materials have high impact strength yet permit a certain desired flexibility in the webs. Ionomeric materials are also resistant to abrasion which is obviously desirable in the spacer blocks of the present invention. They also do not scratch automobile paint, chrome and other finishes like the wood spacer blocks.

Pigments can also be added to the SURLYN such that the spacer blocks are a bright, visible color such as orange. The spacer bar assembly can be placed on the roadside while not in use and serve as a warning for traffic when a stranded vehicle is being serviced on the roadside.

Central support 14 (FIGS. 1 and 2) basically has four walls and a rectangular lateral cross section with a large rectangular opening 16 extending axially through it. Opening 16 is preferably polygonal, square or rectangular in cross section as shown in FIGS. 1 and 2 so that it conforms to and closely receives tow bar 18, which also has basically the same lateral cross-sectional shape. The polygonal cross-sectional shape of the opening 16 and tow bar 18 prevents the tow bar block 12 from rotating on tow bar 18. The proper faces 22, 24, 26, 28 for towing can be selected simply by rotating the entire tow bar assembly about the longitudinal axis of tow bar 18.

As shown in FIG. 2, each face of each spacer block 12 has a different configuration. Face 20, for instance, is flat and has a plurality of grooves 21 in the surface for gripping the surface of the vehicle support element. Face 20 as shown in FIGS. 4 and 5 is used to support a vehicle having planar support elements 28 mounted beneath the rear bumper 38 of vehicle 30. The distance between the top of face 20 and the tow bar 18 is sufficient such that the tow bar will not contact the decorative shroud 40 positioned underneath bumper 38.

Figure 6:
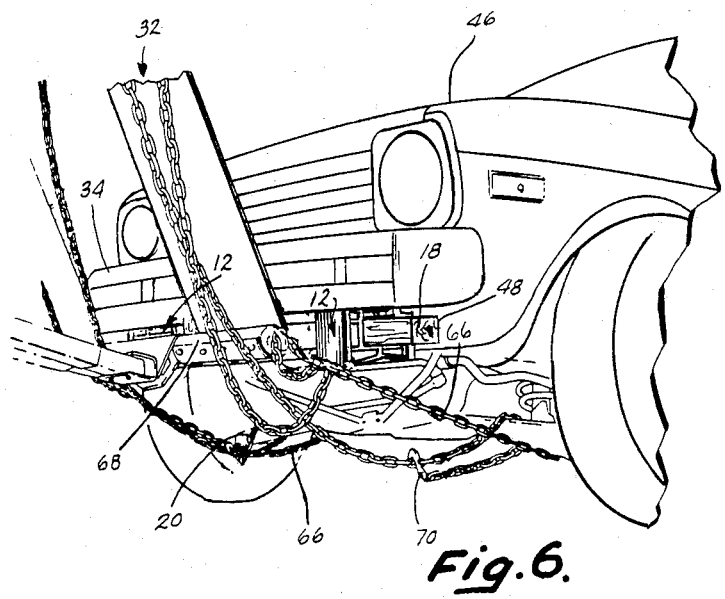
FIG. 6 is a perspective view from below showing the tow bar assembly of the present invention being used to tow another type of vehicle with a sling-type towing device.
Figure 7:
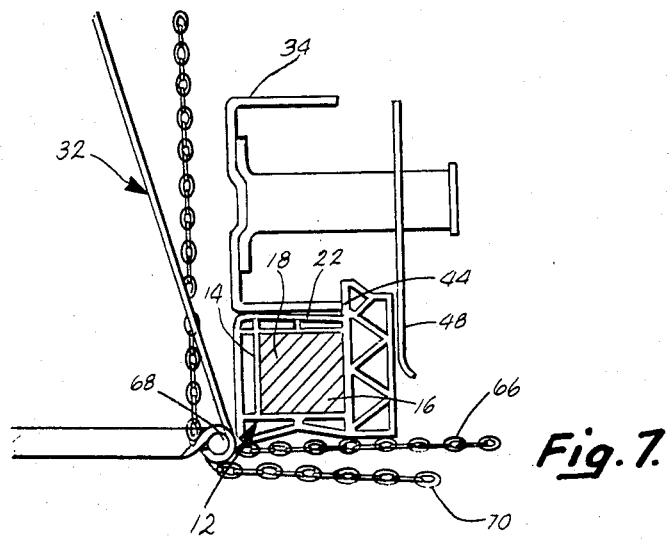
FIG. 7 is a side view partly in section of the mounting of the tow bar assembly of the present invention underneath the vehicle illustrated in FIG. 6.

Face 22, on the other hand, is provided a generally sloping portion 42 which slopes toward a stop 44 which juts outwardly from face 22. The slopping portion 42 of face 22 is designed as shown in FIGS. 6 and 7 to support the underside of a bumper 34. Stop 44 extends behind the bumper to prevent the tow bar assembly from sliding forwardly and being dislodged from underneath the bumper.

Face 24 is similar to face 20 inasmuch as it is planar. However, it does not have the gripping surface and is not positioned quite as far from tow bar 18 as is face 20. This differential spacing allows blocks 12 to accommodate different vehicles having different clearance distances below the vehicle support elements.

Face 26 also has a configuration different from the other faces inasmuch as it is provided with a depression 60 which can be used to support the bottom of a rounded bumper so as to prevent it from being scratched by the towing equipment. The tow bar assembly can also be positioned such that depression 60 engages a rounded chassis member underneath the front or rear of a vehicle to avoid having a bumper support the weight of the car. Depression 60 can also engage the rear axle of a vehicle with the tow bar assembly 10 positioned parallel to and beneath the axle to prevent tow chains from damaging or being tangled with the vehicle's exhaust system.

Faces 20, 22, 24 and 26 extend in a continuous band around central support 14 and are connected thereto by a series of flexible webs 15. Webs 15 include a central web 62 which lies on a plane perpendicular to the axis of opening 16, extends outwardly from central support 14, and connects with each of the faces. Lying on planes perpendicular to central web 62 and on either side thereof are a plurality of lateral webs 64 which reinforce the assembly.

This combination of lateral webs and the central web adds structural integrity to the spacer block while absorbing impact forces. If central web 62 were not provided, for instance, there might be too much flex in webs 64 which would allow the faces to rock perpendicularly with respect to tow bar 18 when an automobile is carried on one of the faces. Similarly, if only a central web 62 were included, the faces would have a tendency to rock from side to side parallel to the tow bar. The integral structural entity formed by the perpendicular webs 62 and 64 prevents the faces from moving or wobbling laterally either parallel or perpendicular to the tow bar under load. However, the structure has sufficient flexibility such that it absorbs much of the impact transmitted to the automobile from the towing apparatus.

In use, the T-hook sling chains 66 of the sling tow assembly 32 are connected to the frame of the car at the end of the car to be lifted during towing. Two tow blocks 12 are slid over the ends of tow bar 18, a wooden four-by-four timber. Tow bar 18 is placed across sling chains 66 with the appropriate faces of the tow bar blocks oriented upwardly to register with the correspondingly configured support surfaces of the support elements (support elements 28 or 34 in the case of FIGS. 4 or 6). Planar face 20, for instance, on each of the two spacer blocks 12 on the tow bar is positioned face up to engage one of the planar support elements 28 of vehicle 30 (FIGS. 4 and 5). Vehicle 30 can then be towed as shown in FIG. 4 with the tow bar assembly 10 supporting it, by a conventional sling-type tow assembly 32. Vehicles with support elements having different configurations can be towed with the same tow bar assembly simply by rotating the tow bar assembly from the position shown in FIG. 4 so that a face having the appropriate shape is presented to the support elements, as shown in FIGS. 6 and 7 where faces 22 are used to engage correspondingly configured bumper 34.

As used in this specification, the term "support elements" designates not only the type of support element 28 shown in FIGS. 4 and 5, but also elements such as axles, control arms and bumpers which can support the vehicle's weight without damage. Tow bar blocks 12 are then slidably positioned laterally along tow bar 18 such that as the tow bar assembly 10 is moved upwardly, the tow bar block faces selected will register with the support elements (28 or 34) of the automobile.

Crossbar 68 of the sling tow assembly 32 is then positioned against the front of the tow bar 18. If spacer blocks 12 are spacedly positioned sufficiently close together, the crossbar 68 may, in fact, contact the forward or lower portions of tow bar blocks 12 as shown in FIG. 7.

The safety chains 70 are then attached around the front or rear axles of the car, depending, of course, on which end is being towed. The sling tow assembly can then be raised such that the appropriate faces of the spacer blocks contact the support elements with the tow bar assembly positioned between the T-hook chains 66 and the car body.

The tow bar assembly of the present invention can be used to tow severely damaged vehicles. Specifically, the tow bar assembly can be positioned underneath the damaged vehicle to get a higher lift than would otherwise be possible without it by orienting face 20 upwardly. The extra lift provided by the tow bar assembly may make it possible to tow a vehicle having a severely bent frame which would cause the vehicle to drag while being towed without the tow bar assembly. Furthermore, grooves 21 afford a secure lift of a damaged vehicle. The use of the tow bar assembly illustrated on the vehicle 46 shown in FIGS. 6 and 7 is to protect the air dam 48 of vehicle 46. The T-hook chains 66 can be positioned underneath the spacer blocks 12 or tow bar 18 out of contact with sheet metal air dam 48. Similarly, the crossbar 68 of sling assembly 32 can be positioned against the lower portions of spacer blocks 12 as shown in FIGS. 6 and 7. If the tow bar assembly 10 were not used on vehicle 46 when towing it by the front bumper as is customary with the type of vehicle shown, the T-hook chains 66 would scrape against the bottom of air dam 48, scratch its finish and very likely bend it out of shape. Likewise, crossbar 68 would be placed against the bumper scratching the chrome. The tow bar assembly using blocks 12 of the present invention not only prevents such damage, but it will stay in the protective position shown in FIGS. 6 and 7 by the engagement of stops 44 with the rear side of the front bumper 34.

Using a tow bar assembly with the novel spacer blocks of the present invention, destructive contact between any of the towing equipment and bodies, fenders or bumpers of the car can be avoided. In fact, in many cases the only contact between the towing equipment and the car occurs at the spacer block faces and the ends of the T-hook chains and safety chains, none of which are in contact with parts of the car which are likely to be damaged by towing equipment.

While one form of the invention has been shown and described, other forms will be apparent to those skilled in the art. Therefore, it will be understood that the embodiment shown in the drawings and described above is merely for illustrative purposes and is not intended to limit the scope of the invention which is defined by the claims which follow.

The embodiments of the invention in which an exclusive property or privilege is claimed are defined as follows:

1. A tow bar block for supporting a vehicle on a tow bar by engaging support surfaces on said vehicle, said tow bar block comprising:
   a central opening therethrough for receiving a tow bar;
   a plurality of faces spaced from said central opening and being oriented outwardly therefrom, at least two of said faces having differing configurations adapted to receive differing shapes of support surfaces on different vehicles, whereby a tow bar can be positioned within said opening in said tow bar block and can be employed to tow a vehicle with said block supporting said vehicle, one of said configured faces engaging a support surface on said vehicle; said faces are integrally formed with one another and said faces extend peripheraly around said central support.

2. The tow bar block as recited in claim 1 wherein said opening is defined by a central support, said faces being spacedly connected to said central support by a plurality of web members, whereby a vehicle supported by one of the faces is cushioned by the flexing of said web members.

3. The tow bar block as recited in claim 2 wherein said central support, faces and web members are integrally formed with one another.

4. The tow bar block as recited in claim 3 wherein said block is made of a tough, polymeric material.

5. The tow bar block as recited in claim 4 wherein said block is made of an ionomeric material.

6. The tow bar block as recited in claim 5 wherein web members comprise a planar central web extending outwardly from said central support and lying on a plane generally perpendicular to the axis of said opening through said central support and a plurality of lateral webs generally perpendicular to said central web located on each side of said central web and extending from said central support to said faces.

7. The tow bar block as recited in claim 6 wherein said faces are integrally formed with one another and extend as a band continuously around said central support.

8. The tow bar block as recited in claim 7 wherein all of said faces have configurations different from the other of said faces.

9. The tow bar block as recited in claim 8 wherein one of said faces is configured so as to provide a stop projecting outwardly from said one face to prevent sliding of said block relative to said support surface in at least one direction along said one face.

10. The tow bar block as recited in claim 9 wherein a second face is provided with a grooved surface for gripping a vehicle support surface.

11. The tow bar block as recited in claim 10 wherein third face has a depression therein for supporting a correspondingly configured support element on a vehicle.

12. The tow bar block as recited in claim 11 wherein a fourth of said faces is planar.

13. The tow bar block as recited in claim 1 wherein one of said faces is configured so as to provide a stop projecting outwardly from said one face to prevent sliding of said block relative to said support surface in at least one direction along said one face.

14. The tow bar block as recited in claim 13 wherein a second face is provided with a grooved surface for gripping a vehicle support surface.

15. The tow bar block as recited in claim 14 wherein a third face has a depression therein for supporting a correspondingly configured support element on a vehicle.

16. The tow bar block as recited in claim 15 wherein a fourth of said faces is planar.

17. The tow bar block of claim 16 wherein at least two of said faces are differentially spaced from said central opening whereby one can accommodate vehicles having differing clearance distances below their support surfaces by orienting different ones of said faces upwardly for receiving said vehicle support surfaces.

18. The tow bar block of claim 15 wherein at least two of said faces are differentially spaced from said central opening whereby one can accommodate vehicles having differing clearance distances below their support surfaces by orienting different ones of said faces upwardly for receiving said vehicle support surfaces.

19. The tow bar block of claim 14 wherein at least two of said faces are differentially spaced from said central opening whereby one can accommodate vehicles having differing clearance distances below their support surfaces by orienting different ones of said faces upwardly for receiving said vehicle support surfaces.

20. The tow bar block of claim 13 wherein at least two of said faces are differentially spaced from said central opening whereby one can accommodate vehicles having differing clearance distances below their support surfaces by orienting different ones of said faces upwardly for receiving said vehicle support surfaces.

21. The tow bar block of claim 9 wherein at least two of said faces are differentially spaced from said central opening whereby one can accommodate vehicles having differing clearance distances below their support surfaces by orienting different ones of said faces upwardly for receiving said vehicle support surfaces.

22. The tow bar block as recited in claim 1 wherein one of said faces is configured so as to provide a stop projecting outwardly from said one face to prevent sliding of said block relative to said support surface in at least one direction along said one face.

23. The tow bar block of claim 22 wherein at least two of said faces are differentially spaced from said central opening whereby one can accommodate vehicles having differing clearance distances below their support surfaces by orienting different ones of said faces upwardly for receiving said vehicle support surfaces.

24. The tow bar block as recited in claim 1 wherein one of said faces is provided with a grooved surface for gripping a vehicle support surface.

25. The tow bar block of claim 24 wherein at least two of said faces are differentially spaced from said central opening whereby one can accommodate vehicles having differing clearance distances below their support surfaces by orienting different ones of said faces upwardly for receiving said vehicle support surfaces.

26. The tow bar block as recited in claim 1 wherein one of said faces has a depression therein for supporting a correspondingly configured support element on a vehicle.

27. The tow bar block of claim 26 wherein at least two of said faces are differentially spaced from said central opening whereby one can accommodate vehicles having differing clearance distances below their support surfaces by orienting different ones of said faces upwardly for receiving said vehicle support surfaces.

28. A tow bar block for supporting a vehicle on a tow bar by engaging support surfaces on said vehicle, said tow bar block comprising:
   a central opening therethrough for receiving a tow bar;
   a plurality of faces spaced from said central opening and being oriented outwardly therefrom;
   at least two of said faces being configured so as to be adapted to engage support surfaces on a vehicle and being spaced differentially from said central opening whereby one can be accommodate vehicles having differing clearance distances below their support surfaces by orienting different ones of said faces upwardly for receiving said vehicle support surfaces;
   said faces are integrally formed with one another and said faces extend peripherally around said central support.

29. The tow bar block as recited in claim 28 wherein said opening is defined by a central support, said faces being spacedly connected to said central support by a plurality of web members, whereby a vehicle supported by one of the faces is cushioned by the flexing of said web members.

30. The tow bar block as recited in claim 29 wherein said central support, faces and web members are integrally formed with one another.

31. The tow bar block as recited in claim 30 wherein said block is made of a tough, polymeric material.

32. A method for supporting a vehicle on a tow bar by engaging support surfaces on said vehicle with a tow bar block comprising:
   providing a tow bar block with a central opening therethrough for receiving a tow bar;
   providing said block with a plurality of faces spaced from said central opening and being oriented outwardly therefrom, at least two of said faces having differing configurations adapted to receive differing shapes of support surfaces on different vehicles;
   positioning a tow bar within said opening in said tow bar block with said block alternately oriented so that one of said configured faces engages a support surface on said vehicle said faces are integrally formed with one another and said faces extend peripherally around said central support.

33. The method as recited in claim 32 wherein a central support is provided surrounding said opening, connecting said faces to said central support by a plurality of web members, whereby a vehicle supported by one of the faces is cushioned by the flexing of said web members.

34. The method as recited in claim 33 wherein said central support, faces and web members are integrally formed with one another.

35. The method as recited in claim 34 wherein said block is made of a tough, polymeric material.

36. The method as recited in claim 35 wherein said block is made of an ionomeric material.

37. The method as recited in claim 36 wherein web members comprise a planar central web extending outwardly from said central support and lying on a plane generally perpendicular to the axis of said opening through said central support and a plurality of lateral webs generally perpendicular to said central web located on each side of said central web and extending from said central support to said faces.

38. The method as recited in claim 37 wherein said faces are integrally formed with one another and extend as a band continuously around said central support.

39. The method as recited in claim 38 wherein all of said faces have configurations different from the other of said faces.

40. The method as recited in claim 39 wherein one of said faces is configured so as to provide a stop projecting outwardly from said one face to prevent sliding of said block relative to said support surface in at least one direction along said one face.

41. The method as recited in claim 40 wherein a second face is provided with a grooved surface for gripping a vehicle support surface.

42. The method as recited in claim 40 wherein a third face has a depression therein for supporting a correspondingly configured support element on a vehicle.

43. The method as recited in claim 42 wherein a fourth of said faces is planar.

44. The method as recited in claim 32 wherein one of said faces is configured so as to provide a stop projecting outwardly from said one face to prevent sliding of said block relative to said support surface in at least one direction along said one face.

45. The method as recited in claim 44 wherein a second face is provided with a grooved surface for gripping a vehicle support surface.

46. The method as recited in claim 45 wherein a third face has a depression therein for supporting a correspondingly configured support element on a vehicle.

47. The method as recited in claim 46 wherein a fourth of said faces is planar.

48. The method of claim 47 wherein at least two of said faces are differentially spaced from said central opening whereby one can accommodate vehicles having differing clearance distances below their support surfaces by orienting different ones of said faces upwardly for receiving said vehicle support surfaces.

49. The method of claim 46 wherein at least two of said faces are differentially spaced from said central opening whereby one can accommodate vehicles having differing clearance distances below their support surfaces by orienting different ones of said faces upwardly for receiving said vehicle support surfaces.

50. The method of claim 45 wherein at least two of said faces are differentially spaced from said central opening whereby one can accommodate vehicles having differing clearance distances below their support surfaces by orienting different ones of said faces upwardly for receiving said vehicle support surfaces.

51. The method of claim 44 wherein at least two of said faces are differentially spaced from said central opening whereby one can accommodate vehicles having differing clearance distances below their support surfaces by orienting different ones of said faces upwardly for receiving said vehicle support surfaces.

52. The method of claim 40 wherein at least two of said faces are differentially spaced from said central opening whereby one can accommodate vehicles having differing clearance distances below their support surfaces by orienting different ones of said faces upwardly for receiving said vehicle support surfaces.

53. The method as recited in claim 32 wherein one of said faces is configured so as to provide a stop projecting outwardly from said one face to prevent sliding of said block relative to said support surface in at least one direction along said one face.

54. The method of claim 53 wherein at least two of said faces are differentially spaced from said central opening whereby one can accommodate vehicles having differing clearance distances below their support surfaces by orienting different ones of said faces upwardly for receiving said vehicle support surfaces.

55. The method as recited in claim 32 wherein one of said faces is provided with a grooved surface for gripping a vehicle support surface.

56. The method of claim 55 wherein at least two of said faces are differentially spaced from said central opening whereby one can accommodate vehicles having differing clearance distances below their support surfaces by orienting different ones of said faces upwardly for receiving said vehicle support surfaces.

57. The method as recited in claim 32 wherein one of said faces has a depression therein for supporting a correspondingly configured support element on a vehicle.

58. The method of claim 57 wherein at least two of said faces are differentially spaced from said central opening whereby one can accommodate vehicles having differing clearance distances below their support surfaces by orienting different ones of said faces upwardly for receiving said vehicle support surfaces.

59. A method for supporting a vehicle on a tow bar by engaging support surfaces on said vehicle with a tow bar block comprising:
providing a central opening through a tow bar block for receiving a tow bar;
providing a plurality of faces spaced from said central opening and being oriented outwardly therefrom;
configuring at least two of said faces so as to be adapted to engage support surfaces on a vehicle and spacing said two faces differentially from said central opening whereby one can accommodate vehicles having differing clearance distances below their support surfaces;
orienting different ones of said faces upwardly for receiving said vehicle support surfaces;
said faces are integrally formed with one another and said faces extend peripherally around said central support.

60. The method as recited in claim 59 wherein said opening is defined by a central support, said faces being spacedly connected to said central support by a plurality of web members, whereby a vehicle supported by one of the faces is cushioned by the flexing of said web members.

61. The method as recited in claim 60 wherein said central support, faces and web members are integrally formed with one another.

62. The method as recited in claim 61 wherein said block is made of a tough, polymeric material.

* * * * *